Q. M. YOUNGS.

Improvement in Sewing Machines.

No. 123,852.  Patented Feb. 20, 1872.

Witnesses:
Chas. Nidd
Geo. W. Mabee

Inventor:
Q. M. Youngs
Per Munn & Co
Attorneys.

123,852

UNITED STATES PATENT OFFICE.

QUINTEN M. YOUNGS, OF UTICA, NEW YORK.

IMPROVEMENT IN SEWING-MACHINES.

Specification forming part of Letters Patent No. 123,852, dated February 20, 1872.

Specification describing a new and useful Improvement in Sewing-Machines, invented by QUINTEN M. YOUNGS, of Utica, in the county of Oneida and State of New York.

My invention consists in having the pulley on the main shaft of a sewing-machine, so arranged that it may be locked with the shaft to drive it in the ordinary operation of the machine, and unlocked to run loose and not work the machine when it is required to use the driving-belt or the said pulley for working the bobbin-winder, and thus avoid having to remove the work from the machine and readjust it again each time a bobbin is to be wound, besides saving the unnecessary running of the machine.

Figure 1:
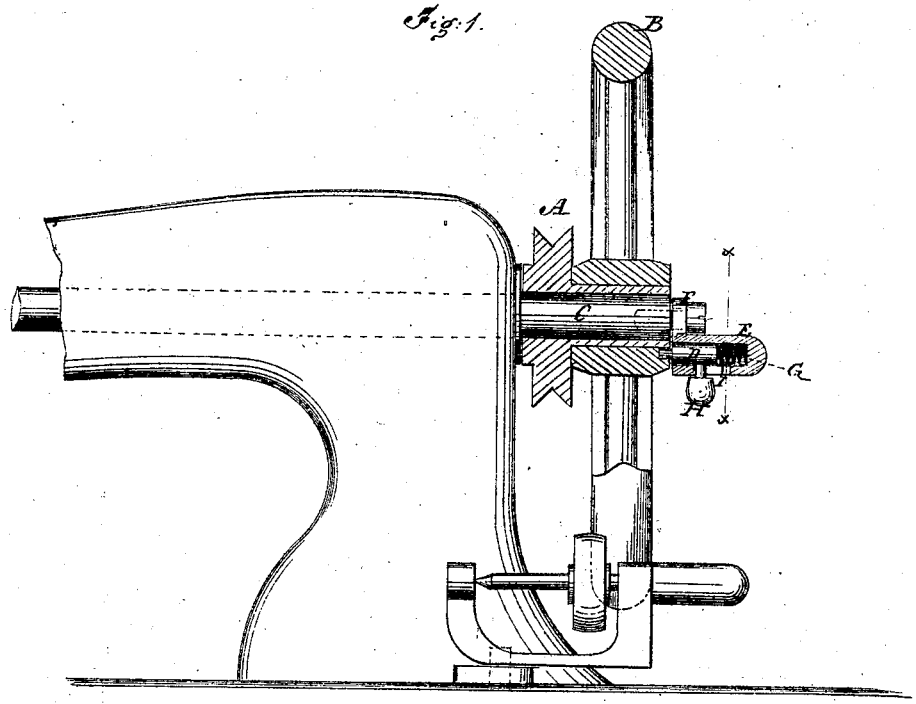
Figure 2:
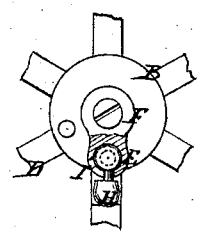

Figure 1 represents the driving-pulley, and one plan of locking apparatus in section, and part of a sewing-machine in side elevation; and Fig. 2 is a section of Fig. 1 on the line x x.

A is the pulley, and B the balance-wheel, for communicating motion to the driving-shaft C. I fit these loosely on the main shaft, and provide a locking device, as hereinafter described, so that they can be readily made fast to the shaft to turn it or be disconnected so as to run loose while winding the bobbins. I place a locking-pin, D, in a socketed piece, E, supported rigidly on the shaft by an arm, F, in such manner that the pin may be pushed into a hole in the hub of the wheel to lock it with the shaft. Behind the pin in the socket is a spring, G, to push said pin into the hole of the wheel, and hold it there, and in the side of the pin is a finger-piece, H, projecting through a slot of the socketed piece E, to be used as a handle for pushing said pin backward to unlock the wheel; also for holding it back while the wheel is to run loose by dropping in a notch, H, at one side of the slot.

Having thus described my invention, I claim as new and desire to secure by Letters Patent—

The combination, with a driving-shaft, C, and a pulley, A, provided with side sleeve, of the locking device D E F G H, constructed and arranged in connection with a sewing-machine, as and for the purpose described.

QUINTEN M. YOUNGS.

Witnesses:
H. HARRISON,
C. W. WARREN.